United States Patent
Brückner et al.

(10) Patent No.: US 6,638,656 B2
(45) Date of Patent: Oct. 28, 2003

(54) PEM FUEL CELL AND PROCESS FOR ITS PRODUCTION

(75) Inventors: Dieter Brückner, Regensburg (DE); Wolfgang Kloke, Tuntenhausen (DE)

(73) Assignee: Siemens Aktiengesellschaft, Munich (DE)

( * ) Notice: Subject to any disclaimer, the term of this patent is extended or adjusted under 35 U.S.C. 154(b) by 236 days.

(21) Appl. No.: 09/918,191

(22) Filed: Jul. 30, 2001

(65) Prior Publication Data

US 2002/0015873 A1 Feb. 7, 2002

Related U.S. Application Data

(63) Continuation of application No. PCT/DE00/00076, filed on Jan. 11, 2000.

(30) Foreign Application Priority Data

Jan. 28, 1999 (DE) .......................... 199 03 352

(51) Int. Cl.[7] .................. H01M 8/10; H01M 8/02
(52) U.S. Cl. ............................. 429/30; 429/35
(58) Field of Search ................... 429/30, 33, 35

(56) References Cited

U.S. PATENT DOCUMENTS 4,514,475 A * 4/1985 Mientek ................. 429/35
6,057,054 A * 5/2000 Barton et al. ............ 429/35 X
6,440,597 B1 * 8/2002 Mizuno .................. 429/35 X
2002/0150810 A1 * 10/2002 Mizuno .................. 429/30 X

FOREIGN PATENT DOCUMENTS

| DE | 195 42 475 A1 | 5/1997 |
| EP | 0 397 072 | 11/1990 |
| JP | 60039770 | 3/1985 |
| JP | 01309264 | 12/1989 |
| JP | 06251780 | 9/1994 |
| JP | 10261423 | 9/1998 |
| WO | PCT/DE95/01603 | 6/1996 |
| WO | PCT/CA96/00343 | 12/1996 |

* cited by examiner

Primary Examiner—John S. Maples
(74) Attorney, Agent, or Firm—Laurence A. Greenberg; Werner H. Stemer; Gregory L. Mayback

(57) ABSTRACT

A PEM fuel cell includes a membrane and electrodes disposed on both sides of the membrane. Terminal plates adjacent to the electrodes delimit a sealed anode gas space and a sealed cathode gas space. An edge of the membrane and the edges of the terminal plates are shaped such that the edges of the terminal plates can be hooked into the edge of the membrane such that the sealed anode gas space and the sealed cathode gas space is formed between the membrane and a respective one of the terminal plates. A process for producing the PEM fuel cell includes fitting the edges of the membrane and the terminal plates into one another.

4 Claims, 1 Drawing Sheet

PEM FUEL CELL AND PROCESS FOR ITS PRODUCTION

CROSS-REFERENCE TO RELATED APPLICATION

This application is a continuation of copending International Application No. PCT/DE00/00076, filed Jan. 11, 2000, which designated the United States.

BACKGROUND OF THE INVENTION

Field of the Invention

The invention relates to a PEM (proton exchange membrane) fuel cell and to a process for producing a PEM fuel cell. The fuel cell is assembled by fitting the edges of a fuel cell membrane and terminal plates into one another.

A PEM fuel cell in which the basic elements of a PEM fuel cell, namely the membrane with an electrode coating on both sides and the two terminal plates, are held together by a special clamp, is for example described in International Publication No. WO 96/41392.

In another type of fuel cells, the membrane projects beyond the electrodes on both sides and is connected to the negative and positive terminal plates via a sealing part, so that a gastight anode gas space and/or cathode gas space is formed between the membrane with the electrode coating and the respective terminal plate. In addition, Published Japanese Patent Application No. JP 60-039770 A discloses a fuel cell with an electrolyte carrier between two gas separators, in which a sealed join is achieved by a structuring which is located on both sides of the carrier and the associated separators. Similarly, in Published European Patent Application No. EP 0 397 072 A1, for a high-temperature fuel cell with a solid electrolyte, the individual structure elements on the edges are stacked on top of one another in a positively locking manner, with the result that an adequate seal is achieved.

However, especially for the production of PEM fuel cells with a proton-conducting membrane, an additional component, such as a bracket and/or seal, and an additional working step are required for mounting this part during assembly of the fuel cell.

SUMMARY OF THE INVENTION

It is accordingly an object of the invention to provide a PEM fuel cell and a process of producing a PEM fuel cell which overcome the above-mentioned disadvantages of the heretofore-known fuel cells and processes of producing a fuel cell of this general type in which the basic elements of the PEM fuel cell, i.e. the membrane, electrodes and terminal plates, are sufficient for assembling the cell.

With the foregoing and other objects in view there is provided, in accordance with the invention, a PEM fuel cell, including:

a membrane having two sides and having a membrane edge;

electrodes respectively disposed on the two sides of the membrane;

two terminal plates including a negative terminal plate and a positive terminal plate respectively adjacent to the electrodes and respectively delimiting a sealed anode gas space and a sealed cathode gas space, the sealed anode gas space and the sealed cathode gas space being sealed with respect to one another at the membrane edge; and each of the two terminal plates having a respective terminal edge, the membrane edge and the terminal edge of each of the two terminal plates being shaped such that the terminal edge of each of the two terminal plates is configured to be hooked into the membrane edge such that the sealed anode gas space and the sealed cathode gas space is formed between the membrane and a respective one of the two terminal plates.

In other words, according to the invention, a fuel cell, includes a membrane with electrodes on both sides and in each case one negative and one positive terminal plate for delimiting the anode gas space and the cathode gas space, in which fuel cell the shape of the edge of the membrane and of the edge of the two terminal plates are adapted to one another, so that during assembly the edges of the two terminal plates hook into the edge of the membrane and a sealed anode gas space and cathode gas space are formed between in each case the membrane and the terminal plate.

With the objects of the invention in view there is also provided, a process for producing a PEM fuel cell including the steps of:

providing a membrane with electrodes disposed on both sides of the membrane;

providing terminal plates including a negative terminal plate and a positive terminal plate respectively adjacent to the electrodes for delimiting a sealed anode gas space and a sealed cathode gas space, the sealed anode gas space and the sealed cathode gas space being sealed with respect to one another at an edge of the membrane; and assembling a PEM fuel cell by hooking respective edges of the terminal plates into the edge of the membrane and providing the terminal plates adjacent to the electrodes such that the sealed anode gas space and the sealed cathode gas space is provided and such that the sealed anode gas space and the sealed cathode gas space are sealed with respect to one another at the edge of the membrane.

In other words, in the process according to the invention for producing a PEM fuel cell, the PEM fuel cell is assembled by hooking the edges of the two terminal plates into the edge of the membrane.

According to an advantageous configuration of the invention, the edge of the membrane is grooved and/or U-shaped, and the edges of the two terminal plates are of the same configuration, likewise being grooved and/or U-shaped, so that the upper and lower terminal plates are hooked into the respective groove wall of the membrane edge. The membrane is made from a sealing material, so that a seal is formed as a result of the terminal plates being hooked into the groove of the membrane edge.

The slotted and/or grooved edge of the membrane, which is suitable for accommodating the terminal plates, may be formed from the outset during production of the membrane or may be injection-molded, welded, adhesively bonded and/or attached by some other method to the finished membrane, possibly even to the finished membrane/electrodes unit. The edge is preferably unreleasably joined to the membrane.

The edge of the terminal plate is preferably straight in its starting form, i.e. in its form prior to assembly of the fuel cell, and is only bent over during the joining of the elements. However, it may also be configured from the outset in such a way that it can be latched into a corresponding membrane edge. The respective edge of the terminal plate may be attached by welding, adhesive bonding, injection molding and/or some other way.

In a preferred embodiment of the invention, the edge seal which is formed from the two terminal plates and the membrane edge is latched together in meandering form along its boundary section, so that the terminal plates bend into the cavity between the active cell surface, i.e. that surface of the membrane which is coated with the electrode, and the U-shaped edge of the membrane. The result is an optimum edge seal.

Other features which are considered as characteristic for the invention are set forth in the appended claims.

Although the invention is illustrated and described herein as embodied in a PEM fuel cell and process for its production, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
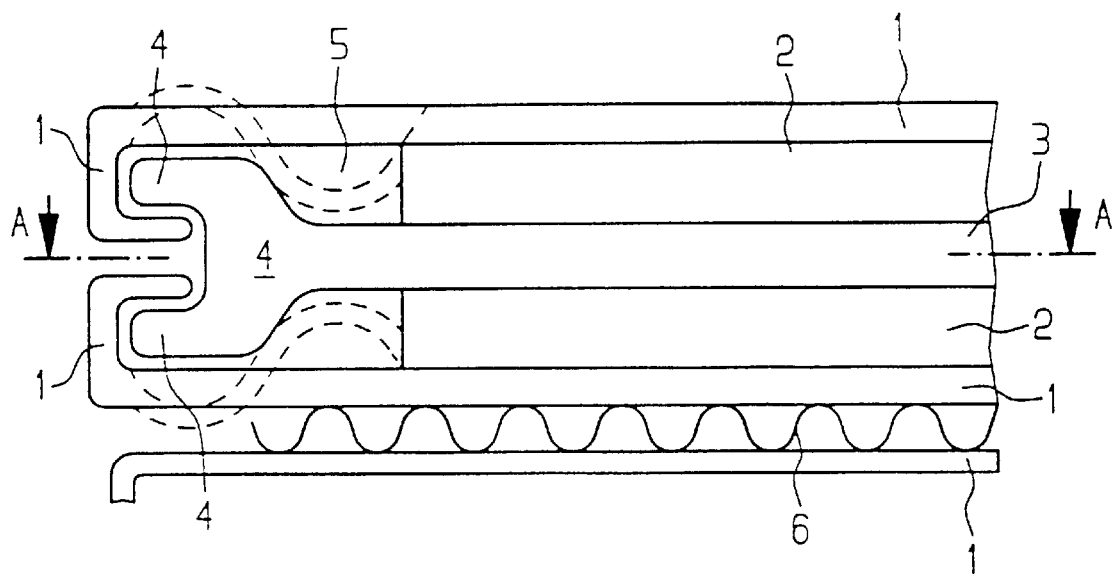
FIG. 1 is a diagrammatic, partial sectional view of a PEM fuel cell according to the invention.

Referring now to the figures of the drawings in detail and first, particularly, to FIG. 1 thereof, there is shown a cross section through a fuel cell. The cell is delimited at the top and bottom by in each case one terminal plate 1. In the center of the fuel cell there is the membrane 3, which has an electrode 2 on both sides. The electrodes 2 cover only the active surface of the membrane 3. The cooling channel 6 is shown between the lower terminal plate 1 and the upper terminal plate 1 of the next (adjoining) fuel cell. The edge 4 of the membrane 3 has no electrode coating and has a U-shaped indentation, in which the edges of the terminal plates 1 are hooked so as to form the edge seal. The edge 4 is, for example, injection-molded onto the membrane 3. To improve the sealing, the edge seal formed by the membrane edge 4 and by the two terminal plates 1 is latched together in meandering, i.e. curved, form along the edge, as indicated by dashed lines in FIG. 1 and as shown explicitly in FIG. 2.

Figure 2:
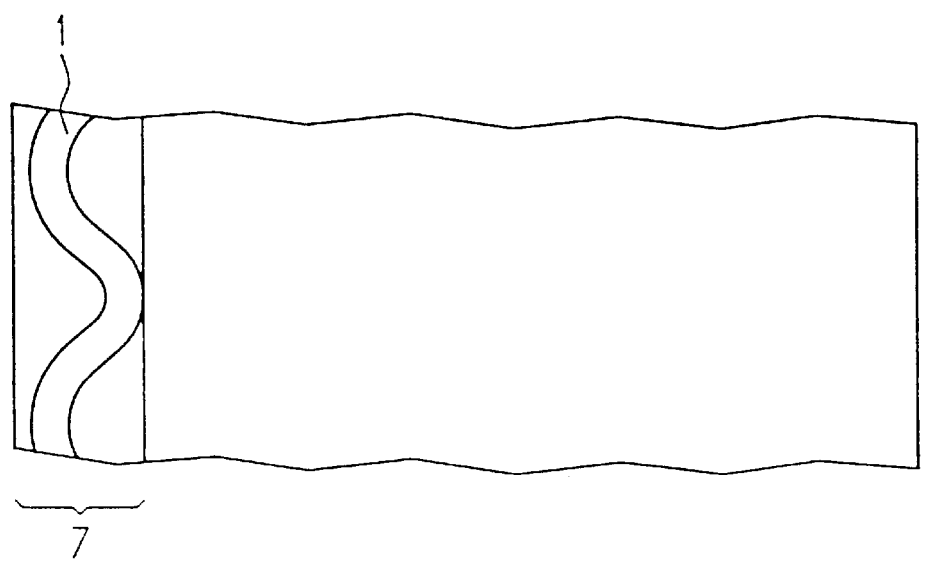
FIG. 2 is a diagrammatic, partial top plan view of a PEM fuel cell according to the invention as seen in a direction indicated by the arrows at section A—A in FIG. 1.

FIG. 2 is a plan view onto section A—A of FIG. 1. Accordingly, the viewer is looking at the membrane 3, which has not been sectioned through its thickness as in FIG. 1, but rather through its flat area. In the edge region 7, one is looking at the hooked-in lower terminal plate 1. The terminal plate 1 is latched in, in a meandering form, i.e. with curved bends, along the boundary section shown, so that the edge, as indicated by dashed lines in FIG. 1, in a repeating manner bends into the cavity 5 between the active surface with electrode 2 and the membrane edge 4. The result is an optimum edge seal.

To produce the fuel cell, the terminal plates 1, the coated membrane 3 and, if appropriate, the cooling sheet 6 are placed loosely on top of one another and in the process are pre-positioned on account of the geometry of the individual parts. In the unjoined starting state, the outer edge of the terminal plates 1 is in this case straight. The functioning cell is then formed by the joining operation of the individual parts in the form of "latching in" the outer edge of the terminal plates 1 in the meandering form shown. In this way, the positive lock between terminal plate 1 and membrane edge 4 allows both gastightness and a "stacking" or stacked connection of the complete cells. The uniform, symmetrical form of the terminal plates of an individual cell is maintained.

The mechanical/structural connection of the two terminal plates to the membrane during assembly of the fuel cell results in a seal in the edge region of the fuel cell, through which gas can be discharged in the event of excess pressure but which is otherwise sealed in a gastight manner with respect to the outside.

The invention is suitable for both stationary and mobile applications of the PEM fuel cell.

We claim:

1. A PEM fuel cell, comprising:
    a membrane having two sides and having a membrane edge;
    electrodes respectively disposed on said two sides of said membrane;
    two terminal plates including a negative terminal plate and a positive terminal plate respectively adjacent to said electrodes and respectively delimiting a sealed anode gas space and a sealed cathode gas space, said sealed anode gas space and said sealed cathode gas space being sealed with respect to one another at said membrane edge; and
    each of said two terminal plates having a respective terminal edge, said membrane edge and said terminal edge of each of said two terminal plates being shaped such that said terminal edge of each of said two terminal plates is configured to be hooked into said membrane edge such that the sealed anode gas space and the sealed cathode gas space is formed between said membrane and a respective one of said two terminal plates.

2. The PEM fuel cell according to claim 1, wherein said membrane edge is formed as one of a grooved edge and a U-shaped edge.

3. The PEM fuel cell according to claim 1, wherein said membrane edge and said respective terminal edge of said two terminal plates form a boundary section, and said membrane edge and said respective terminal edge of said two terminal plates are configured to be latched together in meandering form along said boundary section.

4. A process for producing a PEM fuel cell, the process which comprises:
    providing a membrane with electrodes disposed on both sides of the membrane;
    providing terminal plates including a negative terminal plate and a positive terminal plate respectively adjacent to said electrodes for delimiting a sealed anode gas space and a sealed cathode gas space, the sealed anode gas space and the sealed cathode gas space being sealed with respect to one another at an edge of the membrane; and
    assembling a PEM fuel cell by hooking respective edges of the terminal plates into the edge of the membrane and providing the terminal plates adjacent to the electrodes such that the sealed anode gas space and the sealed cathode gas space is provided and such that the sealed anode gas space and the sealed cathode gas space are sealed with respect to one another at the edge of the membrane.

* * * * *